Patented Dec. 30, 1941

2,267,913

UNITED STATES PATENT OFFICE 2,267,913

FIBROUS ARTICLE OF MANUFACTURE AND METHOD OF MAKING THE SAME

Ralph T. Halstead, Somerville, N. J., assignor to Johns-Manville Corporation, New York, N. Y., a corporation of New York No Drawing. Application May 11, 1938, Serial No. 207,323

6 Claims. (Cl. 106—104)

This invention relates to an article of manufacture and the method of making the same. The invention refers more especially to the bonding of a solid filler material with an aluminate or borate of a polyvalent metal, the filler being preferably reenforcing fibres in contacting relationship to each other.

The invention is useful, particularly, in connection with the bonding of asbestos or mineral wool fibres and will be illustrated by description in connection therewith. It will be understood, however, that other fibres may be used when the very satisfactory results from the use of the inorganic fibres are not necessary. In such cases, there may be used vegetable or animal fibres, as, for instance, wool, hemp, jute or the like.

Briefly stated, the preferred embodiment of the invention comprises fibres bonded by a substantially water-insoluble aluminate or borate of lime or the like, the bonding agent being in the condition of having been precipitated, that is, formed upon the fibres. The invention comprises, also, the method of manufacturing such an article which includes forming and steam curing an intimate mixture of water, the selected fibres, a compound of a polyvalent metal, and a compound of aluminum or boron, the compounds selected being adapted to react with each other upon steam curing, to form a substantially insoluble aluminate or borate.

The invention is illustrated by the following specific examples. If fibres other than asbestos are to be used, they may be substituted for asbestos in these examples.

EXAMPLE I

There is formed an intimate dry mixture of short Canadian chrysotile asbestos fibre, quick or hydrated lime, and finely ground bauxite. In typical mixtures there were used 100 parts by weight of the fibres of such length that approximately 50% by weight are retained on a 10-mesh screen in the Quebec standard screen test, 25 parts of hydrated lime, and bauxite in amount corresponding to 1 to 5 molecular proportions of actual aluminum oxide in the bauxite to 1 molecular proportion of the lime. Thus, the bauxite was used in the weight relation of approximately 35 to 170 parts to 25 parts of the lime.

To the dry mixture there was added enough water to dampen the mass thoroughly, there being used 50 to 85 parts of the water to 100 of the fibres and the amount of water being generally larger within this range in those mixtures using the larger proportions of bauxite.

The wet mixture was then shaped and consolidated under strong compression, as in a mold with a filtering bottom at a pressure of 7,000 pounds to a square inch.

The shaped and compressed product was then subjected to curing by steam at superatmospheric pressure, in this case by steaming in a practically closed container, at a steam pressure of 150 pounds gage to the square inch, for about 24 hours. This steaming causes reaction between the lime and bauxite, with the formation of a calcium aluminate. Since the reaction is conducted in the presence of water and there is formed a substantially insoluble calcium aluminate, the aluminate is called a precipitate.

The cured article is then dried, either at atmospheric or slightly elevated temperatures.

A product so made showed a modulus of rupture varying, with the ratio of alumina in the bauxite to lime as shown in the following table.

*Relation of composition to modulus of rupture*

| Mols of alumina for each mol of lime | Modulus of rupture pounds per square inch (average for 3 to 4 specimens) |
|---|---|
| 1 | 1,008 |
| 2 | 1,310 |
| 3 | 2,005 |
| 5 | 2,230 |

The product is stronger than a similar product made with a precipitated calcium silicate binder, is harder and is resistant to elevated temperatures. For example, the flame of a Meker gas burner failed to cause extensive disintegration of the calcium aluminate bonded fibre block within a quarter of an hour or so, whereas in the same period of time a calcium silicate bonded block was disintegrated.

The calcium aluminate, which is the cementing agent in the block described, is formed in situ. Because the lime and the bauxite are each appreciably soluble in water or for other reasons, they penetrate in part the outer portions of the asbestos fibres and cause the calcium aluminate bond in the finished product to extend a short distance into the fibres. As a result, the cementing agent bonds the fibres together into a unit of strength such as illustrated by the table above.

It will be understood that the details given in this example may be varied. The proportion of lime may be varied, as from 10 to 70 parts for 100 of asbestos. Thus, the compression may be made at lower or higher pressures than 7,000 pounds to the square inch, suitably, at pressures of the order of 2,000 to 10,000 pounds to the square inch. Also, the pressure and length of time of steam may be varied. In general, the length of time of steaming may be made less for relatively thin articles being cured. Also, the temperature of steaming may be reduced, if the length of time for a given thickness is correspondingly increased. However, the temperature of steaming for best results should be always above 100° C. and the time adequate for establishing a practically uniform temperature through the article being hardened.

Example II

The procedure of Example I is modified, as described below, to make a paper, millboard, or yarn.

In making paper or millboard, the mixture of the solid ingredients described under Example I above is made in a paper beater or the like, with a large excess of water, to give a dilute suspension; the shaping and compacting are produced by means of conventional paper or cardboard machines. In making the millboard, there is used, preferably, the machine and method described in the U. S. Reissue Patent No. 12,594, issued to Hatschek on January 15, 1907. The sheets so made are then steam cured, as described above. They may also be dried subsequent to the steam curing, either by a relatively rapid drying operation at an elevated temperature or more slowly at atmospheric temperatures.

Paper or millboard made in this manner is very strong and resistant to disintegration at high temperatures.

In making yarn, spun strands of asbestos or other selected fibre are passed through an aqueous suspension of the solid ingredients described, steamed, and then dried. There is thus produced a calcium aluminate bonded yarn.

There is also an advantage in the manufacturing operation, in that the precipitate of the aluminate minimizes loss of the fibres in the felt-making process. The aluminate, when collected in the felt on the paper-making or millboard machine, serves as a filtering or adhesive medium to decrease the passage of asbestos fibres through the member on which the felting is being done.

Example III

For some purposes the procedure of Examples I or II is modified by substituting, for the lime, another appreciably water-soluble basic compound of a polyvalent metal adapted to form an insoluble aluminate with bauxite, when steamed therewith in the presence of water. Thus, there may be used in place of the lime an equivalent amount of the oxide or hydroxide of magnesium, strontium, and/or barium.

Example IV

While I prefer to use a hydrated aluminum oxide or aluminum hydroxide, as described in connection with Examples I-III, products of a very light color may be made by the substitution of the alumina in the said examples either by an alum, such as hydrated aluminum sulphate or a soda or potash alum, or by an alkali metal aluminate, such as sodium aluminate, the latter being basic in nature. If these latter materials are used, the proportion of them is preferably approximately equivalent to that of the compound of the polyvalent metal (alkaline earth metal oxide or the like) which is incorporated in the original mixture. When the soluble aluminate is used, there may be reacted therewith an equivalent amount of a soluble salt of a polyvalent metal, as, for instance, calcium or magnesium chloride, ferric or ferrous sulphate, manganese nitrate, or the like.

If it is desired to make the metaluminate, such as $Ca(AlO_2)_2$, there are reacted aluminum and alkaline earth metal compounds of the kind described in Examples I-III, in proportions providing two atomic proportions of available aluminum to one of the selected alkaline earth metal. To make the orthoaluminate on the other hand, there are reacted compounds providing 3 atomic proportions of the alkaline earth metal to 2 of the aluminum.

In using the freely water-soluble aluminum compounds, such as an alum or an alkali metal aluminate, along with a soluble compound of a polyvalent metal adapted to form a precipitate with the aluminate, the method and apparatus described above is used with the exception that the steam curing is omitted, this steam curing being not necessary to cause reaction between the freely soluble aluminum compound and the polyvalent metal compounds mentioned.

Example V

The procedure of Example IV is modified by the substitution, for the aluminum compounds there described, of an equivalent proportion of a borate compound.

The borate compound may be calcium metaborate added to the fixture in finely ground form. Or, the borate may be one formed by reaction between some other appreciably soluble borate and a compound of a polyvalent metal adapted to form a substantially insoluble metal borate.

More specifically, I have formed an intimate wet mixture of 100 parts by weight of short Canadian chrysotile asbestos fibres, 54 parts of hydrated calcium metaborate, and 50 parts of water. This mixture I have subjected to strong compression in a filtering mold as described in Example I followed by drying and obtained an article having a modulus of rupture of 1,055 pounds per square inch.

In an article using lead metaborate as the cementing or bonding agent, I have followed this same procedure with a mixture including initially 100 parts by weight of the short asbestos fibres, 154 parts of lead iodide, 54 parts of calcium metaborate dihydrate, and 50 parts of water.

Proportions of bonding agent

The proportions of the bonding or cementing agent may be varied. In general, a larger proportion of the agent is used if it is desired to make a stronger product and if the increased density due to a relatively large proportion of the binder is not objectionable.

Employing as the cementing agent the precipitate formed by the interaction of lime and sodium aluminate, in proportion to correspond to calcium orthoaluminate, that is, $Ca_3(AlO_3)_2$, I have made materials of various strengths with the proportion of the cementing agent in the finished product calculated as 4 to 35% by weight on the dry basis. A proportion of 6 to 12% gives good strength without making the product too heavy.

Products made as described are useful, according to thickness, for gaskets, insulating paper, millboard, and building panels. For these uses the resistance of the cementing agent to being weakened by water and the relatively low expansion or absorption of moisture from the air are desirable features, in addition to those discussed above.

Loose or non-fabricated fibres associated with the aluminate or borate of a polyvalent metal, as described, may be mixed with a friction compound and the resulting mixture made into brake lining or clutch facing. The friction compound used may be a conventional one, as, for instance, a composition including rubber, filler, and vulcanizing material. After the mixture is made, it is shaped and hardened (vulcanized) in manner which is customary for finishing of friction elements including rubber friction compound. Or, a fabric of the selected fibres associated with the aluminate or borate may be impregnated with the friction compound, then pressed to exact shape desired and hardened. For instance, woven or braided asbestos tape or listing may be impregnated or otherwise wetted with an aqueous mixture of the compounds which react to give the desired substantially insoluble aluminate or borate of a polyvalent metal, the reaction between the said compounds made to occur as described above for the particular compounds selected, the product dried, impregnated with the friction compound, and the composition shaped and then hardened.

It will be understood that the details given are for the purpose of illustration, not restriction, and that variations within the spirit of the invention are intended to be included in the scope of the appended claims.

What I claim is:

1. An article of manufacture comprising asbestos fibres and a bonding agent extending within the surface portions of the fibres and cementing the fibres together into a unitary article, the said agent including a compound selected from the group consisting of an aluminate or borate of a polyvalent metal.

2. An article of manufacture comprising felted asbestos fibres and a bonding agent extending within the surface portions of the fibres and cementing the fibres together into a unitary article, the said agent being a substantially insoluble aluminate of a polyvalent metal.

3. A sheet product comprising felted mineral wool fibres and a bonding agent extending within the surface portions of the fibres and cementing the fibres into a unitary article, the said agent being a substantially insoluble metaluminate of a polyvalent metal.

4. An article of manufacture comprising fibres selected from the group consisting of asbestos fibres or mineral wool fibres and a bonding agent extending within the surface portions of the fibres and cementing the fibres into a unitary article, the said agent including a compound selected from the group consisting of an aluminate or borate of a polyvalent metal.

5. An article of manufacture comprising asbestos fibres and a bonding agent therefor extending within the surface portions of the fibres and cementing the fibres into a unitary article, the binding agent comprising precipitated calcium aluminate in the proportion of 4 to 35 parts to 100 parts dry weight of the article.

6. A friction material comprising the article described in claim 1 and friction compound impregnated thereinto.

RALPH T. HALSTEAD.